No. 887,295. PATENTED MAY 12, 1908.
W. WEIDLING.
AUTOMOBILE TIRE.
APPLICATION FILED APR. 29, 1907.

Witnesses:
Clara Peters.
Marg. Marotzke.

Inventor:
Wilhelm Weidling
by Erich Peters
his atty.

UNITED STATES PATENT OFFICE.

WILHELM WEIDLING, OF MAGDEBURG, GERMANY.

AUTOMOBILE-TIRE.

No. 887,295.

Specification of Letters Patent.

Patented May 12, 1908.

Application filed April 29, 1907. Serial No. 370,862.

*To all whom it may concern:*

Be it known that I, WILHELM WEIDLING, merchant, a subject of the King of Prussia, and residing at 38 Werftstrasse, Magdeburg, Germany, have invented a certain new and useful Improvement in Automobile-Tires, of which the following is a specification.

My invention concerns the construction of durable automobile tires.

The invention is shown in the accompanying drawing, in which

Figure 1:
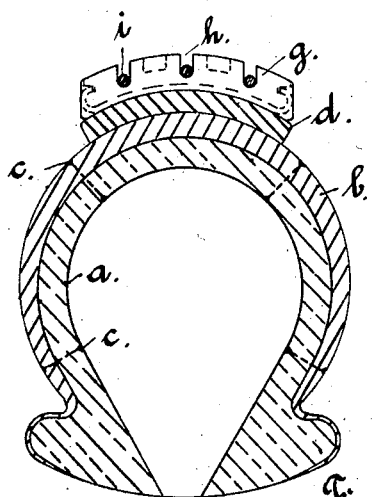
Figure 2:
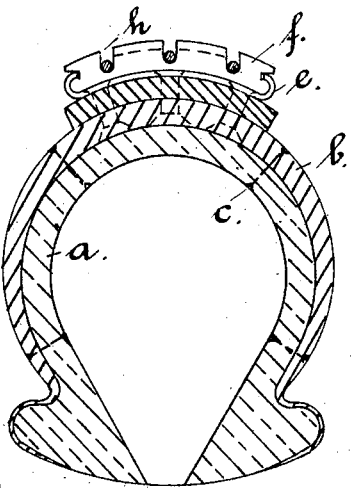
Figure 3:
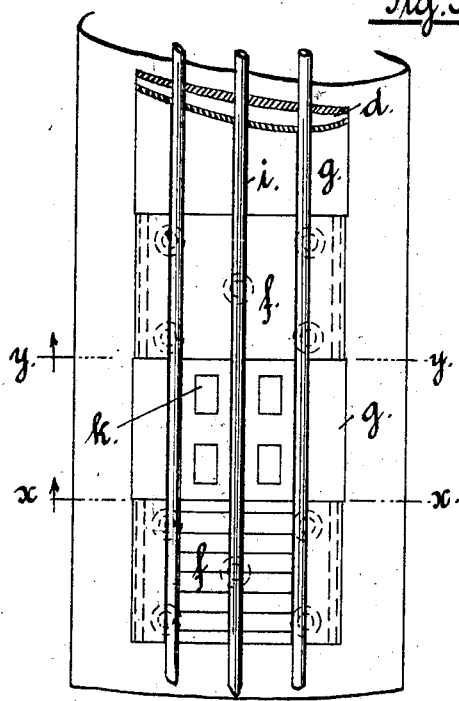
Figure 4:
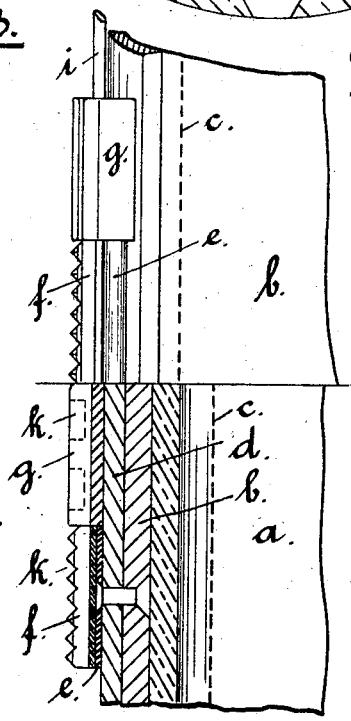

Figures 1 and 2 are cross sections at lines $x-x$ and $y-y$ of Fig. 3. Fig. 3 a view of the tread of the tire, Fig. 4 a side view and a longitudinal section of a part of the tire.

The tire $a$, of any form whatsoever, is covered with the leather protector $b$, which is attached by stitching $c$, the stitches running parallel to the circumference of the wheel. Upon the protector, which forms a leather cover over the whole tire, is placed a strip of leather $d$ and firmly attached to the parts $b$ and $d$ at regular intervals are a number of metallic clips $e$. In these metal clips $e$ detachable wearing blocks $f$ are shoved, which fit tightly, so that they cannot move sidewise. Between these clips $e$ provided with the blocks $f$ lie other blocks of metal $g$ filling the spaces between, so that the two sets together form a continuous ridge around the tread of tire. All of these pieces $f$ and $g$ have a number of corresponding longitudinal grooves $h$, so that when the pieces are placed together, a number of grooves running around the wheel are formed. In these grooves endless flexible bands $i$, for instance wire rope are laid. These form rings whose circumference is of such length that they can easily be placed over the metal pieces, which lie on the circumference of the tire, when the tire is flat, and be laid in the grooves. When the inner tube is inflated, they lie tightly drawn in the grooves of the metal pieces. The strain on the wheel when the vehicle is in motion is thus transferred to the entire circumference of the tire, while the short segments $f$, $g$ prevent the resiliency of the tire from being impaired. The blocks of metal, $f$, $g$ can be provided with holes $k$ in an appropriate manner, which are filled with rubber or the like, in order to prevent slipping.

What I claim as my invention and desire to secure by Letters Patent is:

An automobile tire having a cover of leather, a strip of leather around the outer circumference thereof, clip like holders on the same at regular intervals, metal blocks in said holders other metal blocks laid between the holders both kinds of metal blocks provided with grooves forming together continuous grooves running around the circumference, flexible endless bands in said grooves all as described and for the purpose set forth.

In witness whereof I have hereunto set my hand in presence of two witnesses.

WILHELM WEIDLING.

Witnesses:
MARIE SCHNEIDER,
JAMES L. A. BURRELL.